US012767199B2

(12) United States Patent
Anneser

(10) Patent No.: US 12,767,199 B2
(45) Date of Patent: Oct. 20, 2026

(54) HEIGHT-ADJUSTABLE WHEELBARROW

(71) Applicants: Stefan Anneser, Kirchheim (DE); Florian Stöckle, Haar (DE)

(72) Inventor: Stefan Anneser, Kirchheim (DE)

( * ) Notice: Subject to any disclaimer, the term of this patent is extended or adjusted under 35 U.S.C. 154(b) by 277 days.

(21) Appl. No.: 18/550,723

(22) PCT Filed: Mar. 21, 2022

(86) PCT No.: PCT/EP2022/057327
§ 371 (c)(1),
(2) Date: Sep. 15, 2023

(87) PCT Pub. No.: WO2022/200259
PCT Pub. Date: Sep. 29, 2022

(65) Prior Publication Data

US 2024/0157989 A1 May 16, 2024

(30) Foreign Application Priority Data

Mar. 22, 2021 (DE) ..................... 10 2021 001 506.1

(51) Int. Cl.
*B62B 1/18* (2006.01)
*B62B 5/06* (2006.01)

(52) U.S. Cl.
CPC .............. *B62B 1/186* (2013.01); *B62B 5/064* (2013.01); *B62B 2206/06* (2013.01)

(58) Field of Classification Search
CPC .................................. B62B 1/186; B62B 1/20
See application file for complete search history.

(56) References Cited

U.S. PATENT DOCUMENTS 605,316 A 6/1898 Kneeland
1,580,877 A * 4/1926 Barber ...................... F16C 1/16 24/1

(Continued)

FOREIGN PATENT DOCUMENTS

CA 2807173 12/2016
DE 7416755 U 12/1974

(Continued)

OTHER PUBLICATIONS

International Search Report for PCT/EP2022/057327 dated Jun. 23, 2022 (German Translation).

(Continued)

*Primary Examiner* — Steve Clemmons
(74) *Attorney, Agent, or Firm* — Buchanan Ingersoll & Rooney PC

(57) ABSTRACT

A height-adjustable wheelbarrow can include a loading trough attached to a tubular frame and a first wheel arranged at a front portion of the wheelbarrow. The front portion can be arranged with respect to a longitudinal direction of the wheelbarrow. A second wheel (can be arranged at a rear portion of the wheelbarrow. The rear portion can be arranged with respect to the longitudinal direction of the wheelbarrow. A device for adjusting the height of the wheelbarrow can be formed to adjust a vertical position of the second wheel relative to the loading trough. This device can include a telescopic tube connected at a first axial end portion to the tubular frame and/or the loading trough (and at a second axial end portion to a mounting of the second wheel. The device can also include an actuating device positioned for adjusting a length of the telescopic tube.

15 Claims, 9 Drawing Sheets

(56) References Cited

U.S. PATENT DOCUMENTS

| | | | | |
|---|---|---|---|---|
| 5,884,920 | A * | 3/1999 | Seto | B62B 9/20<br>280/30 |
| 6,099,025 | A | 8/2000 | Rohrs | |
| 6,220,622 | B1 | 4/2001 | Garcia | |
| 2003/0178801 | A1 * | 9/2003 | Hart | B62B 1/20<br>280/47.371 |

FOREIGN PATENT DOCUMENTS

| | | | | |
|---|---|---|---|---|
| DE | 8128829 | U1 * | 2/1982 | |
| DE | 3717580 | A1 | 12/1988 | |
| DE | 20100581 | U1 | 4/2001 | |
| GB | 2310637 | A * | 9/1997 | B62B 1/206 |
| GB | 2445051 | A | 6/2008 | |
| KR | 20120102526 | A | 9/2012 | |

OTHER PUBLICATIONS

Written Opinion of the International Searching Authority for PCT/EP2022/057327 dated Jun. 23, 2022 (German Translation).

* cited by examiner

HEIGHT-ADJUSTABLE WHEELBARROW

CROSS-REFERENCE TO RELATED APPLICATIONS

This application is the U.S. national stage application of International Patent Application No. PCT/EP2022/057327, filed Mar. 21, 2022, which claims priority to German Patent Application No. DE 10 2021 001 506.1, filed on Mar. 22, 2021.

FIELD

The present invention relates to a height adjustable wheelbarrow.

BACKGROUND

Wheelbarrows, also called pushcarts, exist in a wide variety of designs and variants: with flat loading surfaces and loading recesses, with and without front tipping bar, with pneumatic or solid rubber tires, galvanized or painted, and so on. Mostly, they consist of a tubular frame supporting structure, in which the wheel is integrated at the front, the uprights in the middle and the tie bars at the end. On this rigid structure is optionally mounted a loading platform, or a trough.

SUMMARY

I have recognized that there is a disadvantage of conventional wheelbarrows. Due to their standard dimensions, they cannot be optimally adapted to the height of a user and that, especially when heavy loads are frequently transported, the user's back is continuously subjected to excessive strain.

DE 20100581 U1 discloses a wheelbarrow with height-adjustable bars, whereby the substructure of a conventional wheelbarrow or pushbarrow, which consists predominantly of a tubular frame support structure, is purposefully modified or interrupted at various points in such a way that the bars, which were previously rigid or firmly connected to the substructure, can be inserted separately and easily dismantled into other tubular sockets arranged at different heights, or by means of a special shaping and displacement in a correspondingly shaped support structure.

The disadvantage of this solution, however, is that a mere extension of the tie bars allows a certain adjustment of a handle height, but not an individual adjustment of the handle height to the requirements of a particular user. On the other hand, there is still a strain on the user's back when heavy loads are often transported.

In view of this, embodiments of my height adjustable wheelbarrow can be configured to improve existing wheelbarrows so as to enable individual adjustment of a handle height to a height of a user and to relieve the user's back when transporting heavy loads.

In some embodiments, the height-adjustable wheelbarrow can include a loading trough attached to a tubular frame.

Further, the height-adjustable wheelbarrow can include a first wheel arranged at a front portion of the wheelbarrow, said front portion being arranged with respect to a longitudinal direction of the wheelbarrow and a second wheel arranged at a rear portion of the wheelbarrow, said rear portion being arranged with respect to the longitudinal direction of the wheelbarrow.

Further, the height adjustable wheelbarrow can include a device for adjusting the height of the wheelbarrow, which is formed to adjust a vertical position of the second wheel relative to the loading trough.

The device for adjusting the height of the wheelbarrow further can include a telescopic tube connected at a first axial end portion to the tubular frame and/or the loading trough and at a second axial end portion to a mounting of the second wheel, and comprises an actuating device arranged at the telescopic tube for adjusting a tube length of the telescopic tube.

The front section of the wheelbarrow extends from a center point of a central longitudinal axis of the loading trough arranged in the longitudinal direction of the loading trough to a frontmost point of the wheelbarrow.

In this regard, the rear section of the wheelbarrow extends from the center point of the central longitudinal axis of the loading trough arranged in the longitudinal direction of the loading trough to a rearmost point of the wheelbarrow.

Embodiments can permit a user-friendly, individual adjustment of the height of both the loading trough and the handles of the wheelbarrow by providing the device for adjusting the height of the wheelbarrow, which is connected to the tubular frame and/or the loading trough at the first axial end portion and to the second wheel at the second axial end portion.

Furthermore, due to the presence of a rear second wheel, the wheelbarrow can be configured to enable distribution of a load present in the loading trough completely between the two wheels, so that a load on the user, in particular on the user's back, can be avoided.

According to a preferred further embodiment of the invention, it is provided that the telescopic tube comprises a first, in particular outer, tube and a second, in particular inner, tube arranged movably relative to the first tube, wherein the first tube, in particular at the first axial end portion of the telescopic tube, is connected to the tubular frame and/or the loading trough, and wherein the second tube, in particular at the second axial end portion of the telescopic tube, is connected to the mounting of the second wheel.

The provision of the telescopic tube can advantageously enables a safe and stable structure for height adjustment of the wheelbarrow for some embodiments.

In some embodiments, the first tube is connected to a mounting bracket arranged on an underside of the loading trough, wherein a first leg of the mounting bracket is attached to the underside of the loading trough, in particular welded, and wherein a second leg of the mounting bracket is attached, in particular welded, to the first tube of the telescopic tube.

In this way, a secure fastening of the device for adjusting the height of the wheelbarrow, in particular of the telescopic tube, to the loading trough and/or to the tubular frame can be achieved.

In some embodiments, the actuating device is attached to a wall surface of the first tube, in particular at right angles to the wall surface of the first tube, wherein the second tube comprises a plurality of, in particular circular, openings formed along a longitudinal axis, and wherein the actuating device comprises a locking pin insertable into a respective one of the plurality of openings.

Thereby, a secure latching of the locking pin in a respective opening of the second tube can be provided.

In some embodiments, the actuating device comprises a housing attached, in particular welded, to the wall surface of the first tube, wherein a spring element, in particular a helical spring, is arranged inside the housing and acts on the locking pin with a predetermined spring force, and wherein the locking pin is connected to a cable pull which can be actuated by a pull lever.

The operability of the cable pull by means of a pull lever can be configured to advantageously enable a simple operation in the sense of locking as well as unlocking of the device for height adjustment of the wheelbarrow.

The actuating device can be configured so that, in a first position, in particular in a locked position, of the actuating device the spring element inserts the locking pin into one of the openings of the second tube with the predetermined spring force, and wherein in a second position, in particular in an unlocked position, of the actuating device the locking pin is removed from one of the openings of the second tube by actuation of the cable pull.

Thus, a precise locking and unlocking of the device for height adjustment of the wheelbarrow can be achieved in an advantageous manner via such an embodiment.

For some embodiments, the spring element can rest at a first axial end portion on an inner wall of the housing, said inner wall being in particular arranged perpendicular to the axial direction of the spring element, and wherein the spring element rests at a second axial end portion on a bearing surface, said bearing surface in particular being arranged perpendicular to the axial direction of the spring element.

The spring element thus applies a spring force, which is predetermined in accordance with a spring characteristic, to the bearing surface of the locking pin and thereby holds the locking pin in a locked position.

The cable pull can extend along a central longitudinal axis of the spring element, in particular the helical spring, wherein the cable pull is formed, upon actuation of the pull lever, said pull lever being arranged adjacent to a handle arranged at an axial end portion of a holm of the tubular frame, to move the locking pin against a spring force of the spring element out of one of the openings of the second tube.

The pull lever thus effects a user-friendly height adjustability of the wheelbarrow according to respective requirements of the individual user.

In some configurations, the cable pull extends through a housing opening of the actuating device into an interior space of the actuating device, wherein on an outer wall of the housing in the region of the housing opening a threaded bolt is arranged extending at least in part through the housing opening, in particular comprising a hexagonal head bearing against the outer wall of the housing, the threaded bolt being secured at a first axial end portion at the inner wall of the housing by means of a nut, and wherein the cable pull is passed through an opening formed along a central longitudinal axis of the threaded bolt.

The cable pull can thus be guided past the respective components of the actuating device in a space-saving manner.

For some embodiments, an adjusting element screwed onto the threaded bolt is arranged at a second axial end portion of the threaded bolt arranged outside the housing of the actuating device for adjusting a pretension of the cable pull, wherein the cable pull is passed through an opening formed along a central longitudinal axis of the adjusting element, and wherein the pretension of the cable pull is adjustable by axial movement of the adjusting element along the threaded bolt. The adjusting element preferably further determines a penetration depth of the spring element.

According to a preferred further embodiment of the invention, it is provided that the telescopic tube, in a parked state of the wheelbarrow, is aligned substantially perpendicular to the ground or is inclined at a predetermined angle, in particular at an angle of inclination of 0° to 45° to the perpendicular alignment of the telescopic tube to the ground, towards the front section of the wheelbarrow.

Due to the inclination of the telescopic tube towards the front section of the wheelbarrow, extended legroom of a user while pushing the wheelbarrow can be provided in an advantageous manner.

In some embodiments, the tubular frame has a first holm and a second holm, wherein at a respective axial end portion of the first holm and of the second holm, arranged in the region of the rear section of the wheelbarrow, a handle is arranged, wherein a first handle arranged at the first holm and a second handle arranged at the second holm are extendable by a linkage arranged in the first holm and in the second holm. This can advantageously enable a further improved adjustability or adaptability of the wheelbarrow to the individual user.

In some preferred embodiments, the first holm and the second holm of the tubular frame have a first section in the region of the rear section of the wheelbarrow, at which first section they bear at least in part against the loading trough and/or are connected, in particular welded, to the loading trough, wherein the first holm and the second holm of the tubular frame comprise a second section adjoining the first section and angled away from the first section at a predetermined angle, and wherein a joint or hinge is arranged between the first section and the second section for pivoting the second section relative to the first section.

Thus, furthermore, an optimal pivotability of the holms and thereby improved adjustability of the wheelbarrow can be enabled.

For some embodiments, the first section and/or the second section of the first holm and the second holm of the tubular frame are connected to each other by a reinforcing strut.

Other details, objects, and advantages of the invention will become apparent as the following description of certain exemplary embodiments thereof and certain exemplary methods of practicing the same proceeds.

BRIEF DESCRIPTION OF THE DRAWINGS

In the following, the invention will be explained in more detail with reference to exemplary embodiments indicated in the schematic figures of the drawings, in which.

Unless otherwise indicated, like reference signs denote like elements of the drawings.

DETAILED DESCRIPTION

Figure 1:
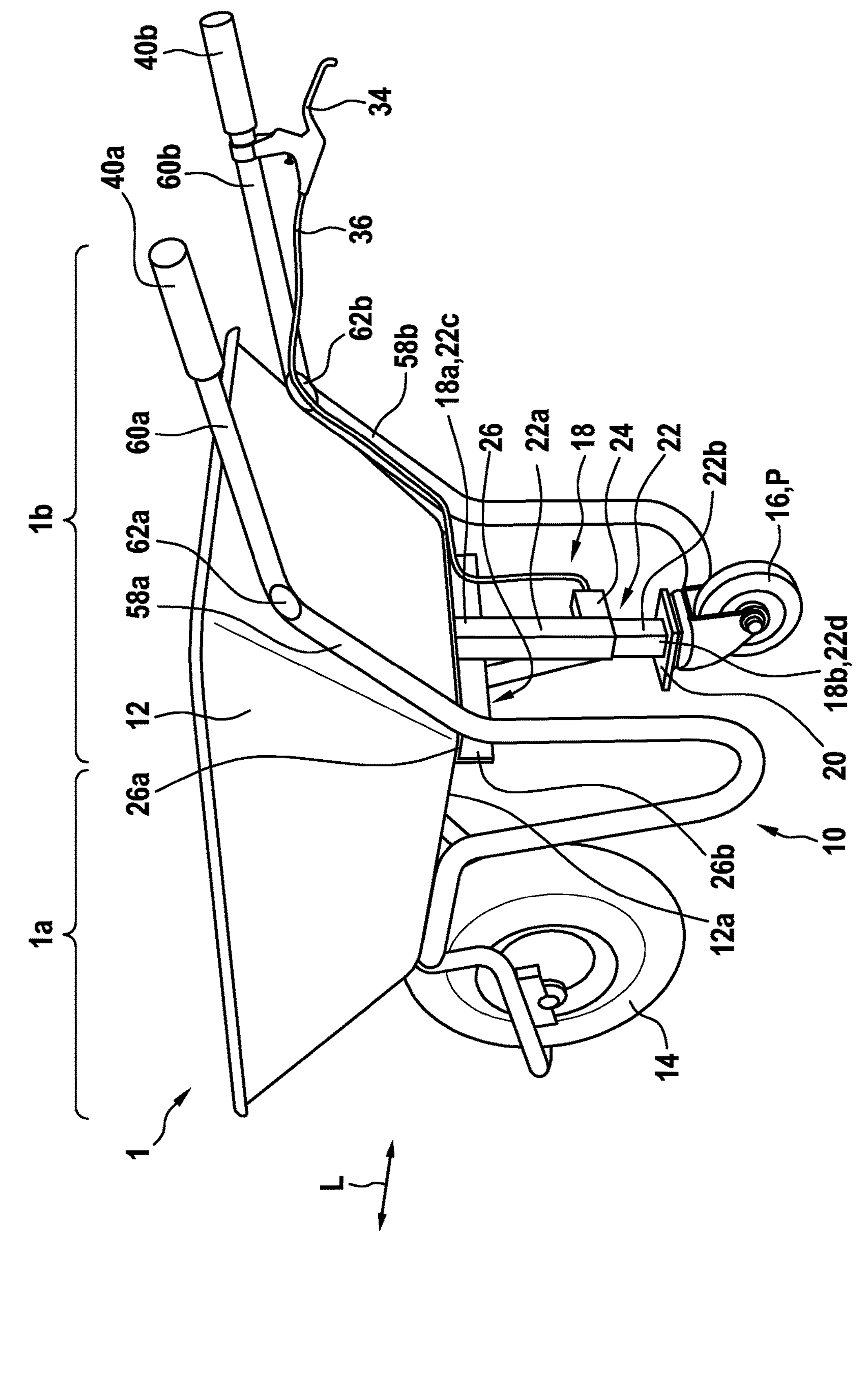
FIG. 1 shows a schematic representation of a height-adjustable wheelbarrow according to a preferred embodiment of the invention.

The height-adjustable wheelbarrow shown in FIG. 1 comprises a loading trough 12 attached to a tubular frame 10, a first wheel 14 arranged at a front portion 1*a* of the wheelbarrow 1, said front portion 1*a* being arranged with respect to a longitudinal direction L of the wheelbarrow 1 and a second wheel 16 arranged at a rear portion 1*b* of the wheelbarrow 1, said rear portion 1*b* being arranged with respect to the longitudinal direction L of the wheelbarrow 1. The first wheel 14 has a larger diameter than the second wheel 14.

The first wheel 14 has a larger dimension than the second wheel 16. The first wheel 14 is preferably provided with pneumatic tires. Alternatively, the first wheel 14 may, for example, be provided with solid rubber tires.

The second wheel 16 is designed as a rotary wheel, for example. Thus, easier maneuverability of the wheelbarrow can be achieved. Alternatively, the second wheel 16 may be of rigid design, for example.

Furthermore, the wheelbarrow 1 comprises a device 18 for adjusting the height of the wheelbarrow 1, which is formed to adjust a vertical position P of the second wheel 16 relative to the loading trough 12, wherein the device 18 for adjusting the height of the wheelbarrow 1 comprises a telescopic tube 22 connected at a first axial end portion 18*a* to the tubular frame 10 and/or the loading trough 12 and at a second axial end portion 18*b* to a mounting 20 of the second wheel 16, and comprises an actuating device 24 arranged at the telescopic tube 22 for adjusting a tube length of the telescopic tube 22.

Alternatively, the device 18 for adjusting the height of the wheelbarrow 1 may be connected to the tubular frame 10 at the first axial end portion 18*a*.

The telescopic tube 22 comprises a first, in particular outer, tube 22*a* and a second, in particular inner, tube 22*b* arranged movably relative to the first tube 22*a*. Alternatively, the first tube 22*a*, in particular at the first axial end portion 22*c* of the telescopic tube 22, is connected to the tubular frame 10 and/or the loading trough 12. The second tube 22*b*, in particular at the second axial end portion 22*d* of the telescopic tube 22, is connected to the mounting 20 of the second wheel 16.

In particular, the first tube 22*a* is connected to a mounting bracket 26 arranged on an underside 12*a* of the loading trough 12.

A first leg 26*a* of the mounting bracket 26 is attached to the underside 12*a* of the loading trough 12, in particular welded, and wherein a second leg 26*b* of the mounting bracket 26 is attached, in particular welded, to the first tube 22*a* of the telescopic tube 22.

Figure 2:
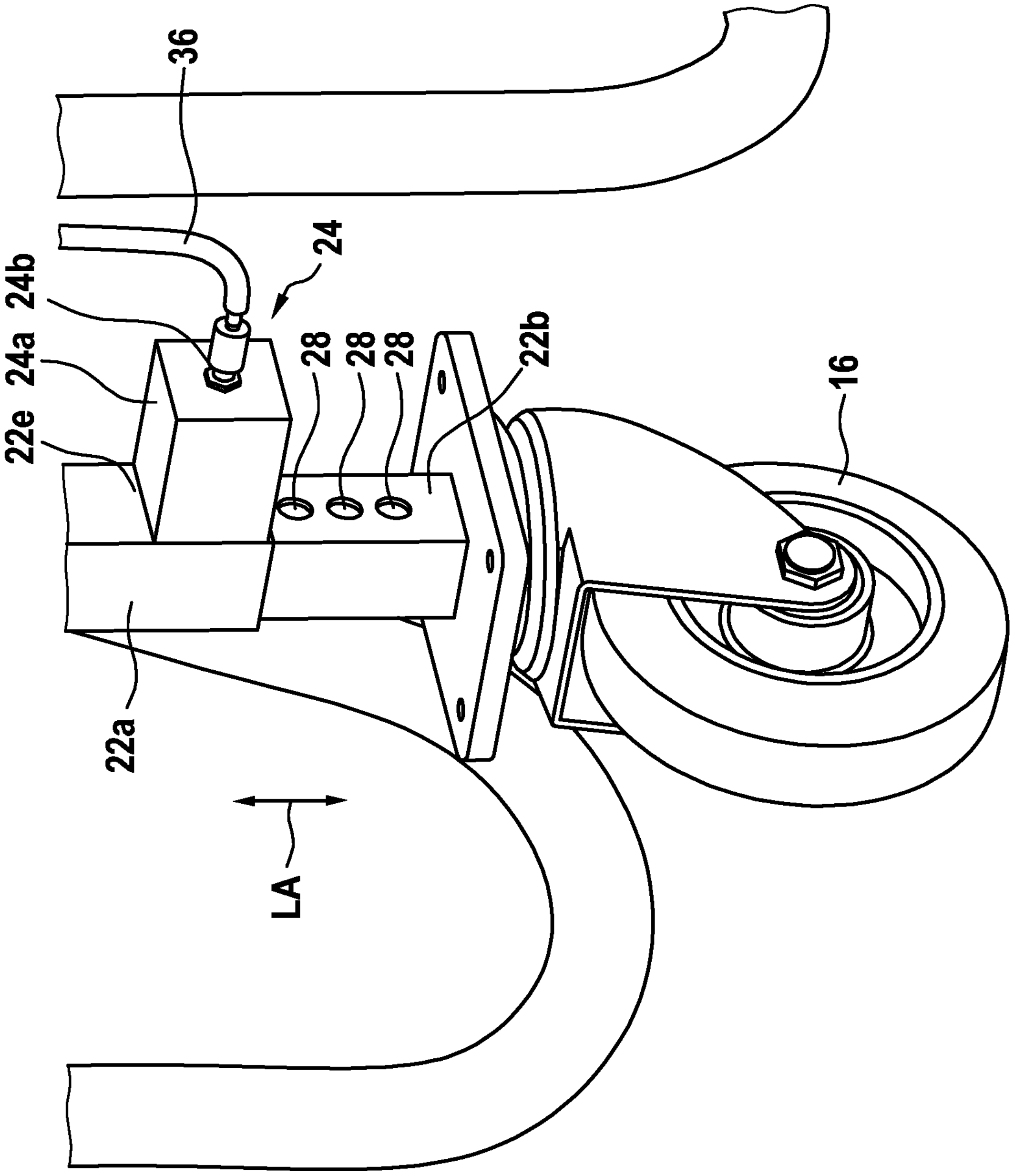
FIG. 2 shows a schematic representation of a device for adjusting the height of the wheelbarrow according to a preferred embodiment of the invention.

FIG. 2 shows a schematic representation of a device for adjusting the height of the wheelbarrow according to the preferred embodiment of the invention.

The actuating device 24 is attached to a wall surface 22*e* of the first tube 22*a*, in particular at right angles to the wall surface 22*e* of the first tube 22*a*.

In this case, the second tube 22*b* comprises a plurality of, in particular circular, openings 28 formed along a longitudinal axis LA, and wherein the actuating device 24 comprises a locking pin 30 insertable into a respective one of the plurality of openings 28.

Figure 3:
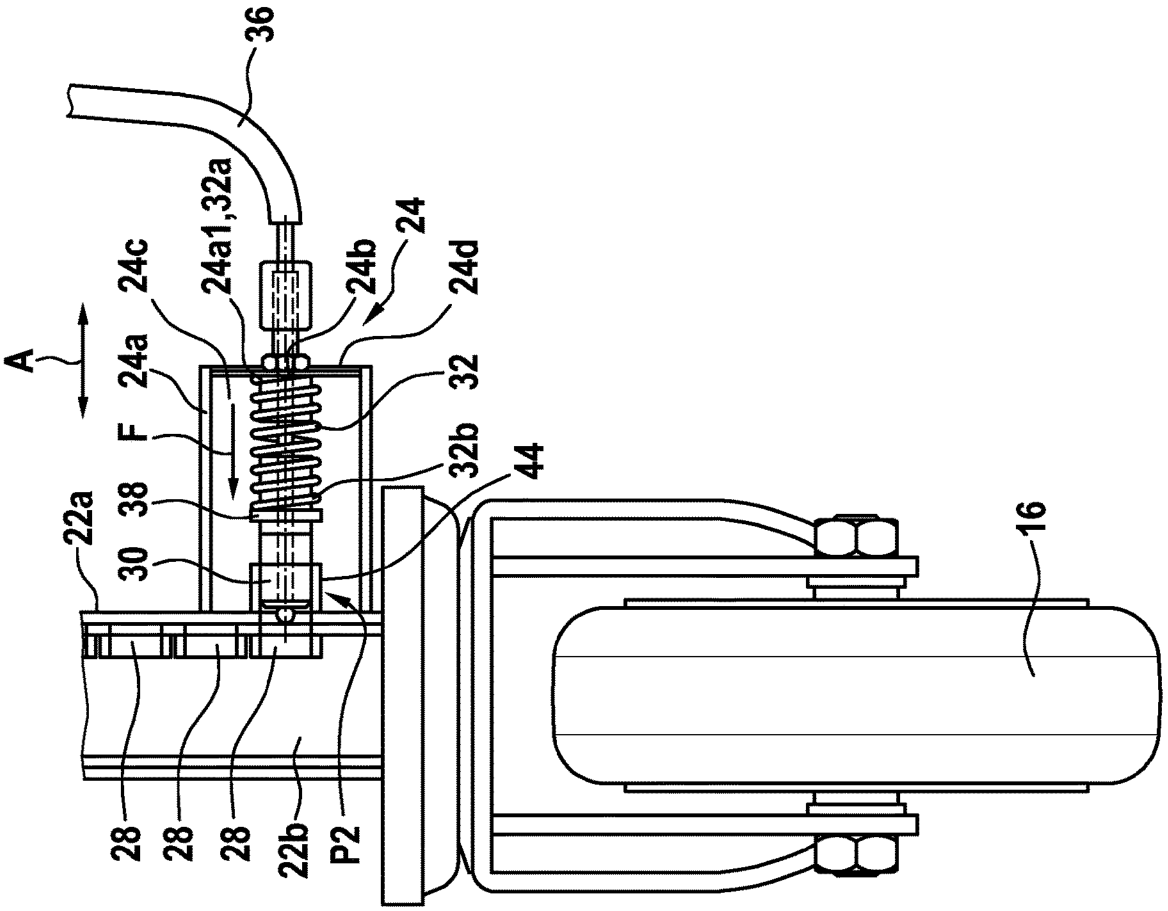
FIG. 3 shows a cross-sectional view of the device for adjusting the height of the wheelbarrow according to the preferred embodiment of the invention.

FIG. 3 shows a cross-sectional view of the device for adjusting the height of the wheelbarrow according to the preferred embodiment of the invention.

The actuating device 24 comprises a housing 24*a* attached, in particular welded, to the wall surface of the first tube 22*a*. A spring element 32, in particular a helical spring, is arranged inside the housing 24*a* and acts on the locking pin 30 with a predetermined spring force F. The locking pin 30 is connected to a cable pull 36 which can be actuated by a pull lever 34.

The spring element 32 rests at a first axial end portion 32*a* on an inner wall 24*a*1 of the housing 24*a*, said inner wall 24*a*1 being in particular arranged perpendicular to the axial direction A of the spring element 32, The spring element 32 further rests at a second axial end portion 32*b* on a bearing surface 38, said bearing surface 38 in particular being arranged perpendicular to the axial direction A of the spring element 32.

The cable pull 36 extends along a central longitudinal axis MA1 of the spring element 32, in particular the helical spring. The cable pull 36 is formed, upon actuation of the pull lever 34, said pull lever being arranged adjacent to a handle 40*a*, 40*b* arranged at an axial end portion of a holm of the tubular frame 10, to move the locking pin 30 against a spring force F of the spring element 32 out of one of the openings 28 of the second tube 22*b*.

The cable pull 36 extends through a housing opening 24*b* of the actuating device 24 into an interior space 24*c* of the actuating device 24. On an outer wall 24*d* of the housing 24*a* in the region of the housing opening 24*b* a threaded bolt 42 is arranged extending at least in part through the housing opening 24*b*, in particular comprising a hexagonal head 42*a* bearing against the outer wall 24*d* of the housing 24*a*.

The threaded bolt 42 being secured at a first axial end portion 42*a* at the inner wall 24*a*1 of the housing 24*a* by means of a nut 46, and wherein the cable pull 36 is passed through an opening 48 formed along a central longitudinal axis MA2 of the threaded bolt 42.

Figure 4:
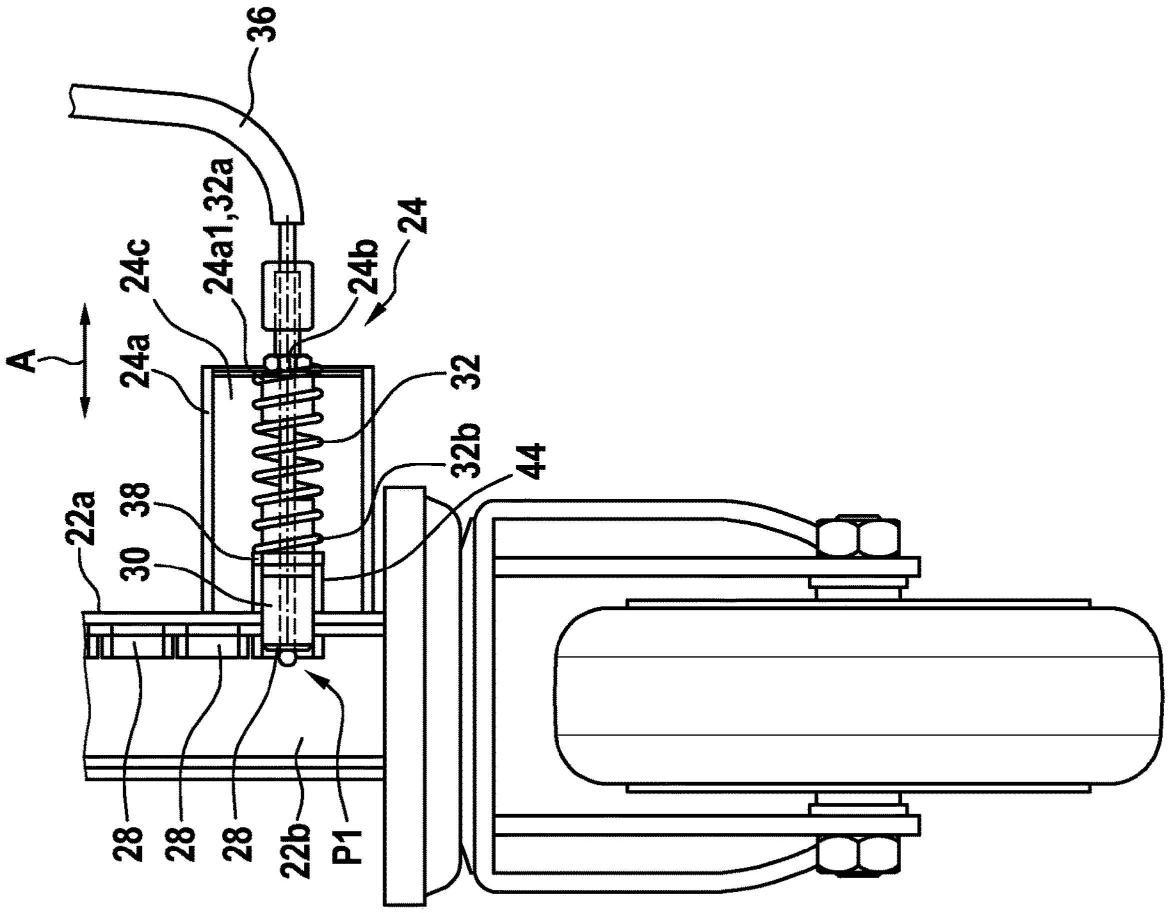
FIG. 4 shows a cross-sectional view of the device for adjusting the height of the wheelbarrow according to the preferred embodiment of the invention.

FIG. 4 shows a cross-sectional view of the device for adjusting the height of the wheelbarrow according to the preferred embodiment of the invention.

In a first position P1, in particular in a locked position, of the actuating device 24 the spring element 32 inserts the locking pin 30 into one of the openings 28 of the second tube 22*b* with the predetermined spring force F.

In a second position P2, in particular in an unlocked position, of the actuating device 24 the locking pin 30 is removed from one of the openings 28 of the second tube 22*b* by actuation of the cable pull 36.

Figure 5:
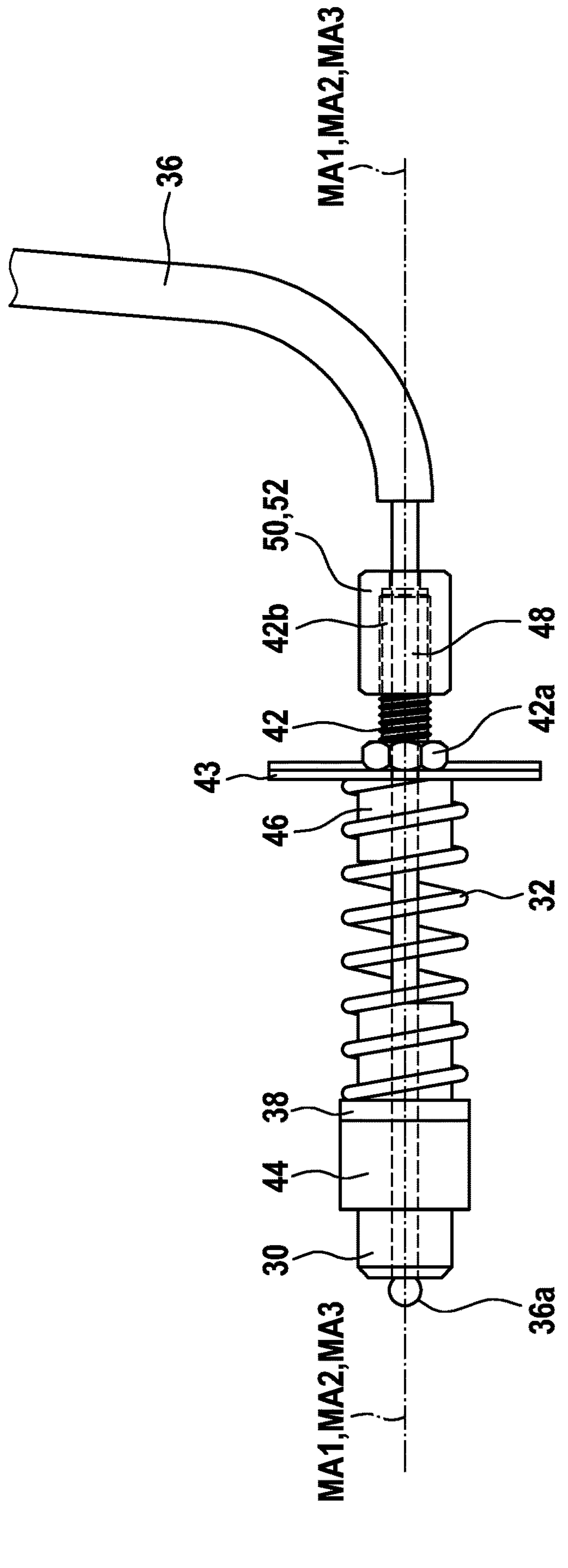
FIG. 5 shows a schematic representation of an actuating device of the device for height adjustment of the wheelbarrow according to the preferred embodiment of the invention.

FIG. 5 shows a schematic representation of an actuating device of the device for height adjustment of the wheelbarrow according to the preferred embodiment of the invention.

An adjusting element 50 screwed onto the threaded bolt 42 is arranged at a second axial end portion 42*b* of the threaded bolt 42 arranged outside the housing 24*a* of the actuating device 24 for adjusting a pretension of the cable pull 36. The cable pull 36 is passed through an opening 52 formed along a central longitudinal axis MA3 of the adjusting element 50, Further, the pretension of the cable pull 36 is adjustable by axial movement of the adjusting element 50 along the threaded bolt 42.

The spring element 32 and the nut 46 further abut a plate-shaped end element 43, which forms a portion of the outer wall of the actuating device 24. The nut 46 is thereby fixedly connected to the end element 43.

In the illustration shown in FIG. 5, the spring element 32 is shown in a relaxed state in which the bearing surface 38 rests against a displacement element 44 of expanded diameter arranged on the locking pin 30. The displacement element 44 is welded to the telescopic tube 22 as shown, for example, in FIG. 4. The locking pin 30 is thereby axially movable in the displacement element 44.

A spherical member 36*a* is disposed at an axial end portion of the locking pin 30. The spherical element 36*a* is connected to an end portion of the cable pull 36 and secures it to the locking pin 30. The spherical element 36*a* is thereby firmly connected to the locking pin 30.

Figure 6:
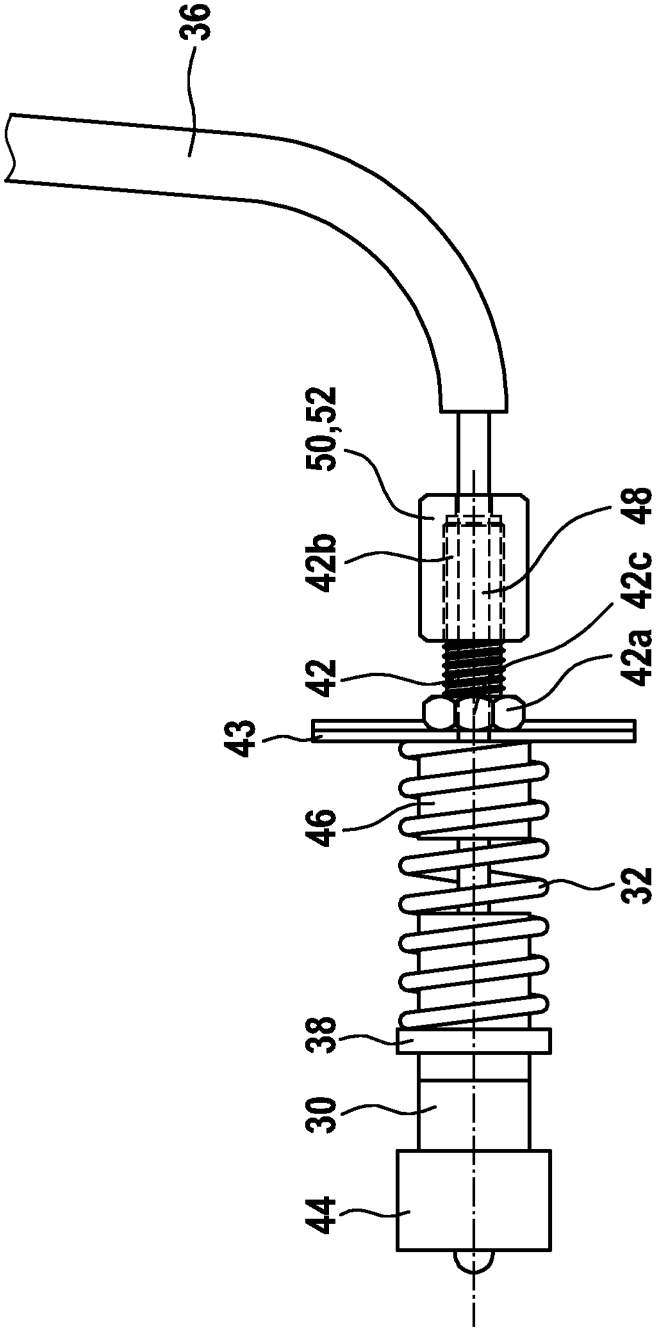
FIG. 6 is a schematic representation of the actuating device of the device for height adjustment of the wheelbarrow according to the preferred embodiment of the invention.

FIG. 6 shows a schematic representation of the actuating device of the device for height adjustment of the wheelbarrow according to the preferred embodiment of the invention.

In the illustration shown in FIG. 6, the spring element 32 is shown in a tensioned state in which the bearing surface 38 is spaced apart from the displacement element 44 of expanded diameter arranged on the locking pin 30.

Figure 7:
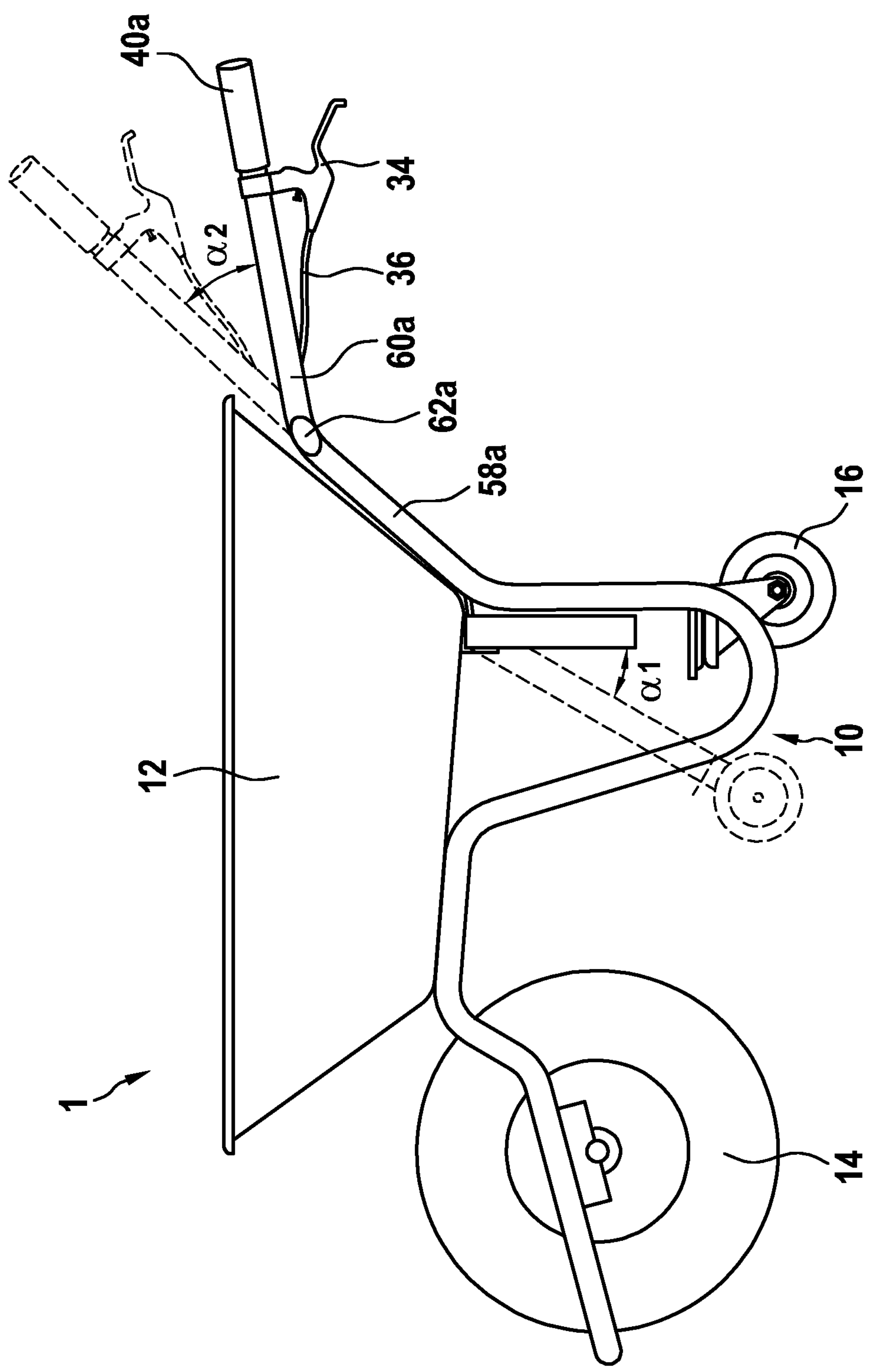
FIG. 7 is a schematic representation of the height-adjustable wheelbarrow according to the preferred embodiment of the invention.

FIG. 7 shows a schematic representation of the height-adjustable wheelbarrow according to the preferred embodiment of the invention.

The telescopic tube 22, in a parked state of the wheelbarrow 1, is aligned substantially perpendicular to the ground.

Alternatively, the telescopic tube 22 may be inclined at a predetermined angle $\alpha 1$, in particular at an angle of inclination of 0° to 45° to the perpendicular alignment of the telescopic tube 22 to the ground, towards the front section 1*a* of the wheelbarrow 1.

Figure 8:
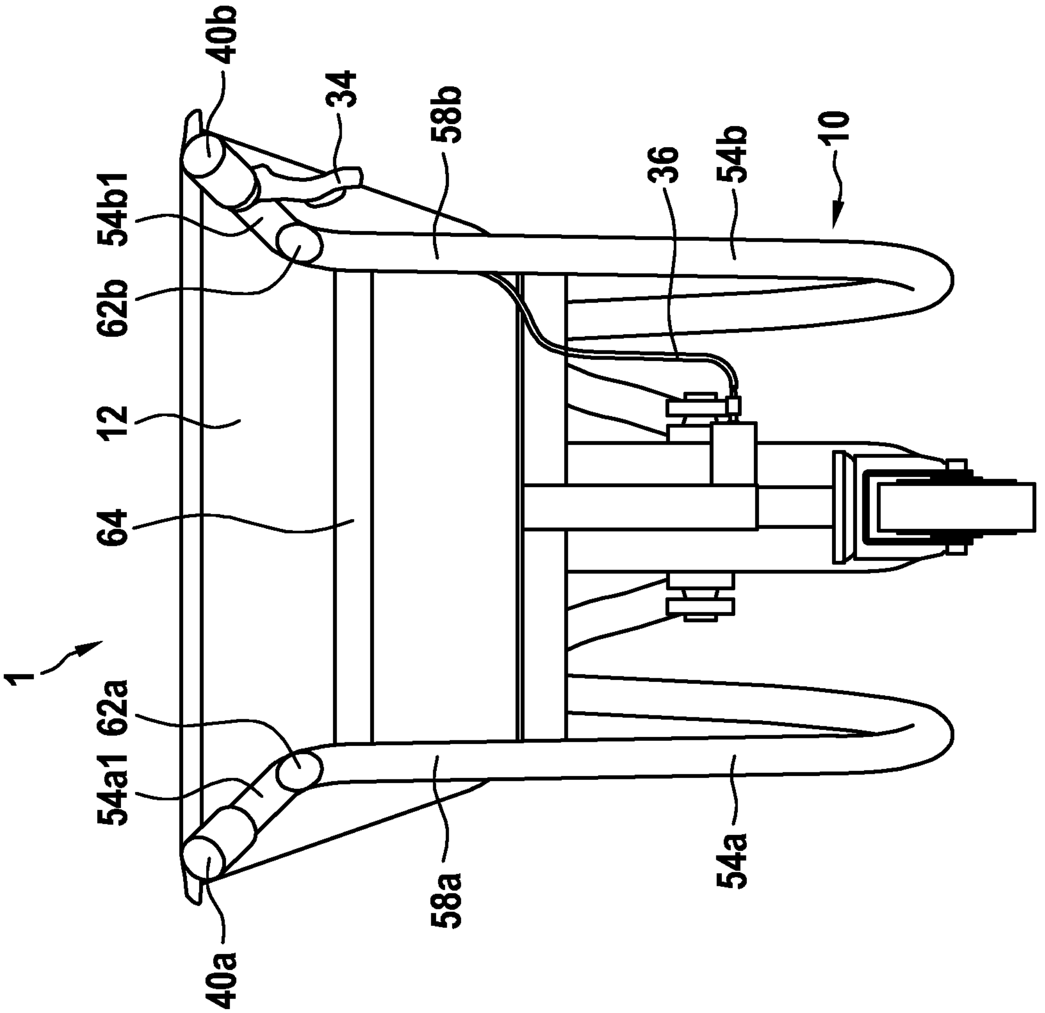
FIG. 8 is a rear view of the height-adjustable wheelbarrow according to the preferred embodiment of the invention.
Figure 8:
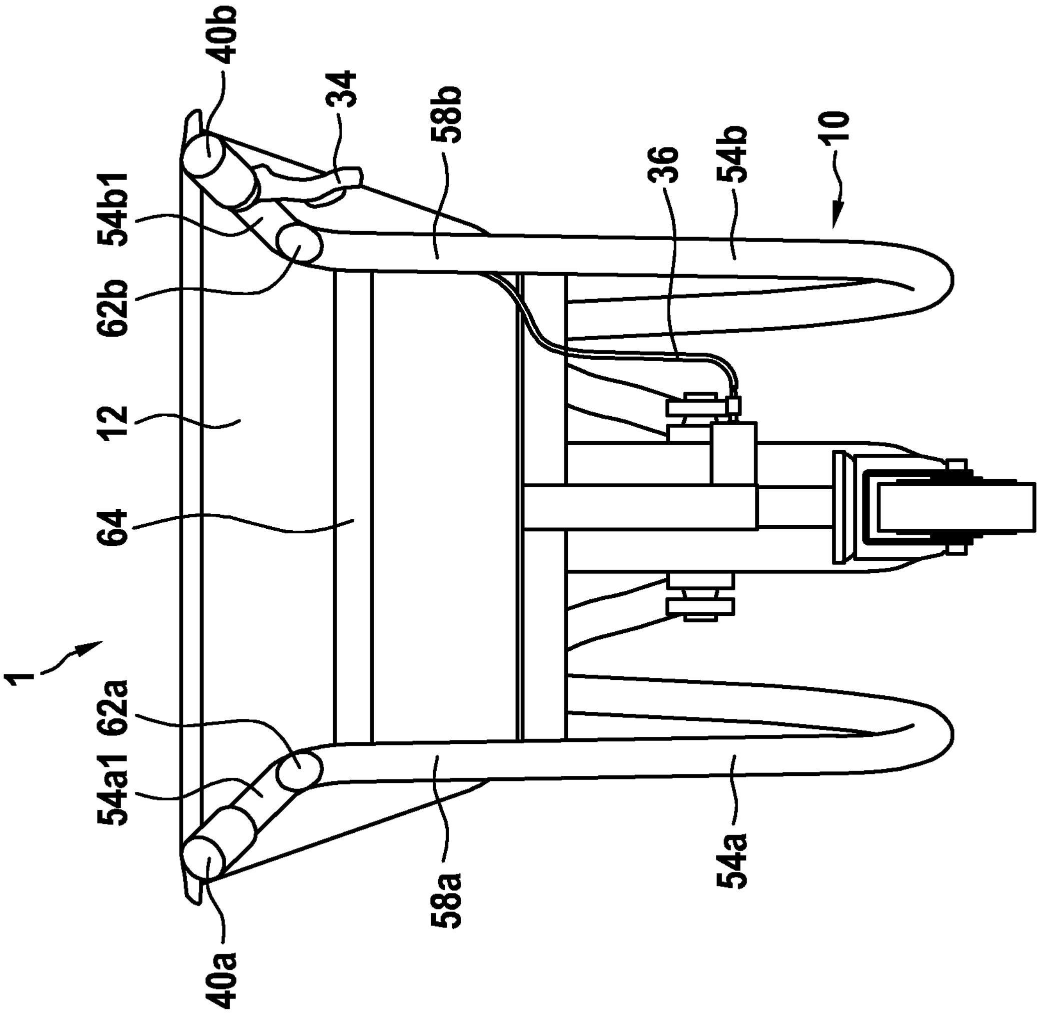

FIG. 8 shows a rear view of the height adjustable wheelbarrow according to the preferred embodiment of the invention.

The tubular frame 10 has a first holm 54*a* and a second holm 54*b*, wherein at a respective axial end portion 54*a*1, 54*b*1 of the first holm 54*a* and of the second holm 54*b*, arranged in the region of the rear section 1*b* of the wheelbarrow 1, a handle 40*a*, 40*b* is arranged.

A first handle 40*a* arranged at the first holm 54*a* and a second handle 40*b* arranged at the second holm 54*b* are extendable by a linkage arranged in the first holm 54*a* and in the second holm 54*b* respectively, which are not shown in FIG. 8.

The first holm 54*a* and the second holm 54*b* of the tubular frame 10 have a first section 58*a*, 58*b* in the region of the rear section 1*b* of the wheelbarrow 1, at which first section 58*a*, 58*b* they bear at least in part against the loading trough 12 and/or are connected, in particular welded, to the loading trough 12.

The first holm 54*a* and the second holm 54*b* of the tubular frame 10 comprise a second section 60*a*, 60*b* adjoining the first section 58*a*, 58*b* and angled away from the first section 58*a*, 58*b* at a predetermined angle.

A joint 62*a*, 62*b* or hinge is arranged between the first section 58*a*, 58*b* and the second section 60*a*, 60*b* for pivoting the second section 60*a*, 60*b* relative to the first section 58*a*, 58*b*. Alternatively, a hinge may be provided instead of the joint, for example.

The first section 58*a*, 58*b* and/or the second section 60*a*, 60*b* of the first holm 54*a* and the second holm 54*b* of the tubular frame 10 are optionally further connected to each other by a reinforcing strut 64.

While certain exemplary embodiments of a height-adjustable wheelbarrow, and methods of making and using the same have been shown and described above, it is to be distinctly understood that the invention is not limited thereto but may be otherwise variously embodied and practiced within the scope of the following claims.

The invention claimed is:

1. A height-adjustable wheelbarrow comprising a loading trough attached to a frame;

a first wheel arranged at a front portion of the wheelbarrow, said front portion being arranged with respect to a longitudinal direction of the wheelbarrow;

a second wheel arranged at a rear portion of the wheelbarrow, said rear portion being arranged with respect to the longitudinal direction of the wheelbarrow;

a device for adjusting the height of the wheelbarrow, the device configured to adjust a vertical position of the second wheel relative to the loading trough, wherein the device comprises:

a telescopic tube comprising a first outer tube and a second inner tube arranged movably relative to the first outer tube, wherein the first outer tube is connected to the frame and/or the loading trough at a first axial end portion of the telescopic tube, and wherein the second inner tube is connected to a mounting of the second wheel at a second axial end portion of the telescopic tube, an actuating device attached to a wall surface of the first outer tube, wherein the second inner tube has a plurality of openings formed along a longitudinal axis, and wherein the actuating device comprises a locking pin insertable into a respective one of the plurality of openings, the actuating device further comprising a housing attached to the wall surface of the first outer tube, wherein a spring element is arranged inside the housing and is configured and positioned to act on the locking pin with a predetermined spring force, and wherein the locking pin is connected to a cable pull which is actuatable by a pull lever;

wherein the cable pull extends along a central longitudinal axis of the spring element; and the pull lever is connected to the cable pull and arranged adjacent to a handle arranged at an axial end portion of a holm of the frame to move the locking pin against the predetermined spring force of the spring element out of one of the openings of the second inner tube.

2. The height-adjustable wheelbarrow of claim 1, wherein the first outer tube is connected to a mounting bracket arranged on an underside of the loading trough, wherein a first leg of the mounting bracket is attached to the underside of the loading trough and wherein a second leg of the mounting bracket is attached to the first outer tube of the telescopic tube.

3. The height-adjustable wheelbarrow of claim 1, wherein the spring element is a helical spring.

4. The height-adjustable wheelbarrow of claim 1, wherein the actuating device is configured such that:

in a locked position of the actuating device, the spring element inserts the locking pin into one of the openings of the second inner tube with the predetermined spring force, and in an unlocked position of the actuating device the locking pin is removed from the one of the openings of the second inner tube via actuation of the cable pull.

5. The height-adjustable wheelbarrow of claim 4, wherein the spring element is configured to rest at a first axial end portion on an inner wall of the housing, and the spring element also rests at a second axial end portion on a bearing surface.

6. The height-adjustable wheelbarrow of claim 1, wherein:

the cable pull extends through a housing opening of the actuating device into an interior space of the actuating device, on an outer wall of the housing in a region of the housing opening has a threaded bolt arranged to extend at least in part through the housing opening to bear against the outer wall of the housing, the threaded bolt being secured at a first axial end portion at the inner wall of the housing and the cable pull is passed through an opening formed along a central longitudinal axis of the threaded bolt.

7. The height-adjustable wheelbarrow according to claim 6, wherein:

an adjusting element is positioned on the threaded bolt at a second axial end portion of the threaded bolt arranged outside the housing of the actuating device for adjusting a pretension of the cable pull, the cable pull being passed through an opening formed along a central longitudinal axis of the adjusting element, and wherein the pretension of the cable pull is adjustable via axial movement of the adjusting element along the threaded bolt.

8. The height-adjustable wheelbarrow of claim 1, wherein the telescopic tube is configured so that, in a parked state of the wheelbarrow, the telescopic tube is aligned substantially perpendicular to the ground or is inclined at a predetermined angle of inclination to the perpendicular alignment of the telescopic tube to the ground towards the front section of the wheelbarrow.

9. The height-adjustable wheelbarrow of claim 8, wherein the predetermined angle of inclination is 0° to 45°.

10. The height-adjustable wheelbarrow of claim 1, wherein a first holm of the frame and a second holm of the frame have a first section adjacent the rear section of the wheelbarrow that bears at least in part against the loading trough and/or is connected to the loading trough, and wherein the first holm and the second holm have a second section adjoining the first section and angled away from the first section at a predetermined angle, and wherein a joint or hinge is arranged between the first section and the second section for pivoting the second section relative to the first section.

11. The height-adjustable wheelbarrow of claim 10, wherein the first section and/or the second section of the first holm and the second holm are connected to each other by a reinforcing strut.

12. The height-adjustable wheelbarrow of claim 1, wherein the frame is a tubular frame.

13. The height-adjustable wheelbarrow of claim 1, wherein the telescopic tube is configured so that, in a parked state of the wheelbarrow, the telescopic tube is aligned substantially perpendicular to the ground such that the telescopic tube extends vertically between the frame and the mounting of the second wheel.

14. The height-adjustable wheelbarrow of claim 1, wherein the telescopic tube is configured so that, in a parked state of the wheelbarrow, the telescopic tube is aligned substantially perpendicular to the ground such that the telescopic tube extends vertically between the loading trough and the mounting of the second wheel.

15. The height-adjustable wheelbarrow of claim 1, wherein the telescopic tube is configured so that, in a parked state of the wheelbarrow, the telescopic tube is aligned relative to the ground such that the telescopic tube extends at a predetermined angle of inclination from the mounting of the second wheel to the frame and/or the loading trough, the predetermined angle of inclination being between 0° and 45°.

* * * * *